United States Patent
Le Gendre et al.

(10) Patent No.: US 12,189,404 B2
(45) Date of Patent: Jan. 7, 2025

(54) DYNAMIC METHOD FOR RAPIDLY FILLING IDENTICAL BATCHES OF BOTTLE OF GAS MIXTURES WITH HIGH METROLOGICAL PRECISION

(71) Applicant: L'Air Liquide, Société Anonyme pour l'Etude et l'Exploitation des Procédés Georges Claude, Paris (FR)

(72) Inventors: Erwann Le Gendre, Ivry sur Seine (FR); Christian Daviet, Paris (FR); Werner Weterings, Breda (NL); Maurice Koch, Dusseldorf (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 15 days.

(21) Appl. No.: 18/210,214

(22) Filed: Jun. 15, 2023

(65) Prior Publication Data

US 2024/0004407 A1    Jan. 4, 2024

(30) Foreign Application Priority Data

Jun. 17, 2022   (FR) .................................. 2205967

(51) Int. Cl.

| | |
|---|---|
| *B01F 23/10* | (2022.01) |
| *B65B 1/04* | (2006.01) |
| *B65B 1/30* | (2006.01) |
| *B65B 31/04* | (2006.01) |
| *F17C 5/00* | (2006.01) |

(Continued)

(52) U.S. Cl.
CPC ............ *G05D 11/132* (2013.01); *B01F 23/10* (2022.01); *B65B 1/04* (2013.01); *B65B 1/30* (2013.01); *B65B 31/04* (2013.01); *F17C 5/00* (2013.01); *F17C 13/02* (2013.01)

(58) Field of Classification Search
CPC ........ G05D 11/132; B01F 23/10; B65B 31/04; F17C 5/00; F17C 13/02
See application file for complete search history.

(56) References Cited

U.S. PATENT DOCUMENTS

| | | | | |
|---|---|---|---|---|
| 6,382,227 B1 * | 5/2002 | Birch | .................... | G05D 11/132 137/88 |
| 2001/0032668 A1 * | 10/2001 | Doty | .................... | G05D 11/138 137/93 |

(Continued)

FOREIGN PATENT DOCUMENTS

| | | |
|---|---|---|
| EP | 0 877 196 | 11/1998 |
| EP | 2 153 109 | 8/2010 |

(Continued)

OTHER PUBLICATIONS

French Search Report for corresponding FR 2205967, Feb. 13, 2023.

*Primary Examiner* — Jason K Niesz
(74) *Attorney, Agent, or Firm* — Elwood L. Haynes

(57) ABSTRACT

A method for filling a batch of gas bottles with a gas mixture, wherein the gas mixture may have of a single constituent in a matrix or a plurality of constituents in a matrix, which matrix has of one or more base gases, in which a real-time analysis of all the constituents of the gas mixture is carried out at the exit of a mixing chamber and before it enters a compression stage.

2 Claims, 2 Drawing Sheets

(51) Int. Cl.
*F17C 13/02* (2006.01)
*G05D 11/13* (2006.01)

(56) References Cited

U.S. PATENT DOCUMENTS

2010/0132437 A1  6/2010  Bleys et al.
2010/0224264 A1* 9/2010  Homan ............... H01L 21/2225
                                              137/602

FOREIGN PATENT DOCUMENTS

FR    2 532 858    3/1984
FR    2 811 909    1/2002

\* cited by examiner

DYNAMIC METHOD FOR RAPIDLY FILLING IDENTICAL BATCHES OF BOTTLE OF GAS MIXTURES WITH HIGH METROLOGICAL PRECISION

CROSS REFERENCE TO RELATED APPLICATIONS

This application claims the benefit of priority under 35 U.S.C. § 119 (a) and (b) to French Patent Application No. 2205967, filed Jun. 17, 2022, the entire contents of which are incorporated herein by reference.

BACKGROUND

The present invention relates to the field of gas analysis, and more particularly concerns the fields of manufacturing and packaging gas mixtures for calibration methods.

Gas calibration bottles are used in numerous applications. The calibration of gas analysers which monitor the gas emissions of light and heavy motorized vehicles is one example of an application.

Calibration bottles of gas mixtures must comply with the international standards in force. These standards require a well-defined uncertainty over the concentration of the constituents of the gas mixture (see for example the standards ISO 17025 and ISO 17034).

This uncertainty over the concentration of the constituents of a gas mixture represents a challenge during such manufacture of mixtures, in particular requiring strict monitoring of the filling conditions.

There are various types of filling methods, for example gravimetric methods or dynamic methods. When filling by a gravimetric method, the bottles are filled with an initially regulated method which is not subsequently modified, or which may be modified deterministically during the production of the bottles.

SUMMARY

As will be seen in more detail below, the present invention proposes a novel dynamic filling method which makes it possible to produce identical batches of bottles, which are themselves identical, of reference gas mixtures, and to do so rapidly, flexibly and in a way which is slaved to the target composition, and with a very high level of exactitude in the metrological sense of the term.

The gas mixture may be composed of one component in a matrix (binary mixture) or a plurality of constituents in a matrix (multicomponent mixture), in which case the matrix itself may be composed of a plurality of constituents, for example a synthetic air.

The objects of the present invention are in particular:
  to produce once a batch of identical bottles which may even extend up to a large number of bottles, for example up to 24 bottles.
  to produce series of identical batches of entirely identical bottles.
  to produce a new batch of bottles which is identical to a batch produced during a previous operation or a previous period.
  to deliver an identical conformity certificate which is valid for all the bottles of a given batch or even for a plurality of batches of bottles.
  to produce a batch of bottles on the basis of a bottle whose concentration is known or even unknown (on condition that it can be analysed prior to the filling).
  to produce a new batch of bottles by identically replacing a batch which is defective or polluted during use.

Once achieved, these objects allow a user site to order a bottle or a batch of bottles or even a series of batches of bottles which are identical to that or those already used, without having to modify its internal calibration method.

The present invention thus also makes it possible to produce (or even reproduce) a bottle or a batch of bottles or even a series of batches of bottles on the basis of a bottle which is used as an internal reference for the user site, in which case this reference bottle may come from any origin on condition that it can be analysed prior to the requested filling.

These points help users to increase efficiency and productivity by limiting or even eliminating the variations and the time spent in regulating and adjusting their analysis methods. In particular, this is done by not having to change the concentration value of the calibration gas in the analytical method when changing the calibration bottle.

The present invention also aims, in particular, to make it possible:
  to produce a batch of bottles with a medium flow rate (for example 50 $m^3$/hour) or with a high flow rate (for example 100 $m^3$/hour) in order to reduce the filling time.
  to produce a batch of 24 identical bottles in about 2 hours with a high flow rate.
  to produce a batch of 12 identical bottles in about 2 hours with a medium flow rate.
  to produce a batch of 3 identical bottles in about 30 minutes with a medium flow rate.
  to very rapidly (typically less than 30 minutes) carry out the production of a bottle or a batch of bottles with a new composition after the production of a batch of bottles with a different first composition.

These points make it possible to accelerate the production process, increasing the rate of availability of the filling installation and improving its productivity to reach high productivities, up to 4 to 6 batches of 24 bottles per day, thus reducing the turnaround time between the ordering and the delivery of the product to the user site.

The present invention also aims to make it possible:
  to analyse all the constituents simultaneously, on-line and with very high accuracy during the filling.
  to calculate precisely the concentration obtained for each component at the end of the filling.
  to calculate precisely the concentration reached throughout the filling, and thus to monitor correct running of the filling.
  to control automatically the manufacture of the batch of bottles dynamically with the aid of a feedback cycle.
  to automate and control dynamically the production of the batch of gas mixture bottles in a way which is slaved to the target composition.
  to produce a batch of bottles while guaranteeing the concentration obtained on the basis of the concentration calculated in real time and without necessarily having to analyse the batch of bottles after the filling.

These points make it possible to stop the filling process as quickly as possible in case of an anomaly, or to decide that the product will be compliant or at least acceptable at the end of the filling.

The present invention also aims to make it possible:
  to produce the mixture without external contaminants and impurities.

to produce a bottle or a batch of bottles with a production error of less than 0.5% relative for each component of the target mixture.

to produce a bottle or a batch of bottles with an expanded relative uncertainty (k=2) of less than 1% for each component.

to produce internally homogeneous batch of bottles with a factor "$S_{bb}$" of less than 0.1% ("$S_{bb}$" being a factor internationally used for the concept of "Between Bottle Homogeneity").

to produce a series of batches of bottles with a homogeneity of less than 0.71% relative for each component of the mixture (identical batches of bottles).

to produce batches compliant with the requirements of the standards ISO 17025 and ISO 17034.

These points make it possible to produce gas mixtures with high traceability and knowledge of associated uncertainties. This information is necessary for certain user sites and certain fields of application. In particular, it is known that in the field of measuring motor vehicle emissions, the traceability and the uncertainty of the reference mixtures are strictly controlled and regulated.

The present invention also aims to make it possible:

to change easily from the production of one concentration range to another (ranging from ppm·mol to %·mol) as well as from some molecules of interest to others (CO and/or $CO_2$ and/or $O_2$ and/or NO and/or $CO_2$ and/or $CH_4$ and/or $C_3H_8$, etc. in a varied matrix, $N_2$ or synthetic air, or the like).

This point allows great flexibility and high productivity in the use of the dynamic mixer by adapting rapidly to the requirement of the user sites and to the needs of new markets which might arise.

The present invention also aims to make it possible:

to analyse all the constituents of the mixture simultaneously in post-filling to carry out semi-automatically a post-filling analysis of a single bottle or each bottle during the production of a batch of bottles.

This also makes it possible to analyse a bottle at the end of production or in succession each bottle of all or part of a batch of bottles, in order:

i. to monitor the exact concentration of the gas mixture in the bottle or in each bottle of all or part of a batch.

ii. to monitor the production deviation between the final concentration and the target concentration for the or each bottle of all or part of a batch.

iii. to monitor the homogeneity deviation between each bottle of all or part of a given batch (or between a plurality of batches of bottles produced).

iv. to carry out all the analyses required by a user site.

v. to carry out all the analyses required by the international standards.

It should furthermore be noted that the invention makes it possible to carry out the analysis at the same location as the filling, thus reducing the transport time of a bottle or a batch of bottles, avoiding the handling risks associated with transporting bottles, the risks of external contaminations when disconnecting and reconnecting the gas connections, and the risks of unavailability or congestion of the other analysis means of the site.

The present invention also aims to make it possible:

to produce a batch of bottles with a gas mixture at the same target pressure.

to produce a batch of bottles while automatically stopping the filling at the target pressure, taking into account the fact that the filling dynamics cause heating of the mixture in the bottle and the pressure is consequently increased by this during the filling.

These points ensure optimum quality and reliability during the production of a bottle or a batch of bottles while offering the user site the possibility of selecting the desired pressure and of systematically obtaining the same amount of material in the bottle and/or in each bottle of the batch.

The present invention also aims to make it possible:

to produce a batch of bottles while tolerating production incidents such as pressure reductions and/or brief supply interruptions (on condition of no pollution and that the incidents do not occur too late at the end of the filling cycle).

to produce a batch of bottles while minimizing the quantity of gas lost, in particular when regulating the target flow rates.

to avoid resumptions of a malfunctioning or non-compliant production, for example if there is an excessive production deviation.

to produce a batch of bottles without having to fill superfluous bottles, by offering an operating principle that does not require a minimum number of bottles (the filling performances being guaranteed from 2 or 3 bottles to 24 or even more).

These points allow a high reliability of the mixing system by overcoming the random errors inherent in any electronic system.

The mixing system adapts automatically during the filling of a bottle or a batch of bottles in order to correct these errors so as to approach the target concentration as accurately as possible. This high reliability makes it possible to optimize the production cycles by significantly reducing the production errors.

The solutions available in the prior art of this field and their limitations will now be examined below.

These solutions may be summarized as follows:

Limitation 1: The existing mixing systems include numerous steps to be triggered manually and conditionally on the initiative and by the judgement of the qualified operator in the essentially indispensable light of intermediate and final analyses. These tasks limit the production capacity and the filling speed, and may also be sources of errors, the inter-operator variability for instance increasing the uncertainty over the mixtures produced.

Limitation 2: The difference in concentration and uncertainty between different batches of bottles of a given mixture is often significant. This limitation often leads to a new batch being delivered to the site with a different concentration from the previous ones and/or with a production deviation which is relatively large in relation to what is expected. The result is that the user sites have to carry out their entire calibration procedure for each new batch of bottles.

Limitation 3: If the difference in concentration and uncertainty is too great, it is still possible to offer the user site the batch outside specification under derogation, but this may involve a non-negligible time for discussion, negotiation and having the means and packaging on standby.

Limitation 4: In order to limit the difference in concentration and uncertainty between different batches of bottles of a given mixture, it is often necessary to add extra manual filling steps in order to reduce the difference observed. It may even sometimes be necessary to carry out a full purge of the batch before repeating its filling from the start, unless the batch is processed under derogation (as mentioned in limitation 3).

Limitation 5: In order to evaluate the difference in concentration and uncertainty between different batches of bottles of a given mixture and thus evaluate the need to add extra manual filling steps in order to reduce the difference observed, it is necessary to carry out one or more intermediate and/or final analysis phases in the laboratory, and these require transport of the bottles as well as a significant logistical time.

Limitation 6: The existing solutions lack flexibility. Once the solution has been installed, it is very difficult to modify the range of constituents or the range of concentrations of the initial specifications.

Limitation 7: The existing solutions do not incorporate a slaving system and feedback cycle. The filling cycle is not managed automatically and dynamically, which greatly limits the monitoring and verification of the final concentration in real time. Once initially regulated, the method is not modified or is modified deterministically and manually during the production of the batch of bottles.

Limitation 8: Since the existing solutions do not incorporate a slaving system and feedback cycle, the production of bottles or batches of bottles is subject to the random errors of the measuring and flow systems during the filling. It is thus very difficult to produce perfectly identical batches of bottles (typically with an inter-batch homogeneity of less than 0.71% relative).

As will be seen below, the solution of the present invention overcomes all these limitations.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

The present invention will be described below.

The base gases, also referred to as "matrix" gases (generally nitrogen or synthetic air) are stored in a reservoir.

The pure gases (such as CO and/or CO2 and/or C3H8 and/or CH4 and/or NO and/or O2, etc.) which will be used to produce the gas mixtures, also referred to as "mixing gases", are stored in high-pressure bottles.

The reference gases used to calibrate the analytical system are stored in high-pressure bottles.

The gas lines which convey the base gas and the mixing gas for a binary mixture, or the various mixing gases for a multi-component mixture, to the mass flow controllers are conventionally filtered, sometimes heated, and regulated in pressure, for example to 4 bar.

Mass flow controllers are specifically selected and implemented here in order to control the partial flow rates of the mixing gases and the base gases extremely stably and at the same time reactively. The number of mass controllers employed may be modified easily according to requirements.

Each gas line (base gas and mixing gas) whose flow rate is regulated by mass controllers is injected into a mixing chamber.

The various constituents (base gas+mixing gas) are mixed intelligently: elimination of the explosion risk during the combined injection of $O_2$ (injection upstream of the mixing chamber) and hydrocarbons such as propane (injection downstream of the mixing chamber); homogenization to avoid the formation of a gas stream via the injection of the gases into the mixing chamber with a particular geometry, thus creating a homogeneous gas mixture in full safety.

Figure 1:
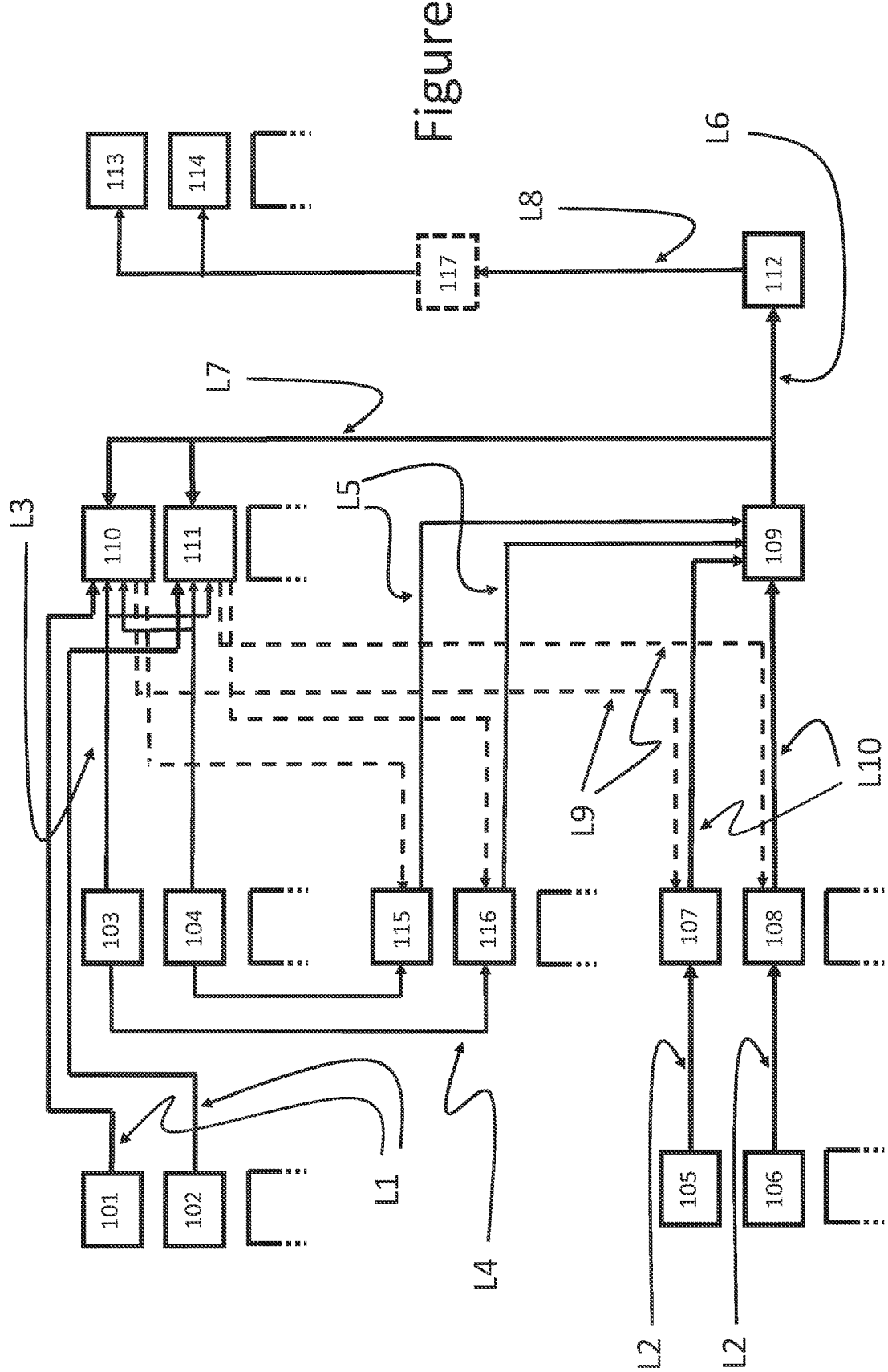
FIG. 1 illustrates an example of an installation suitable for carrying out the invention.
Figure 2:
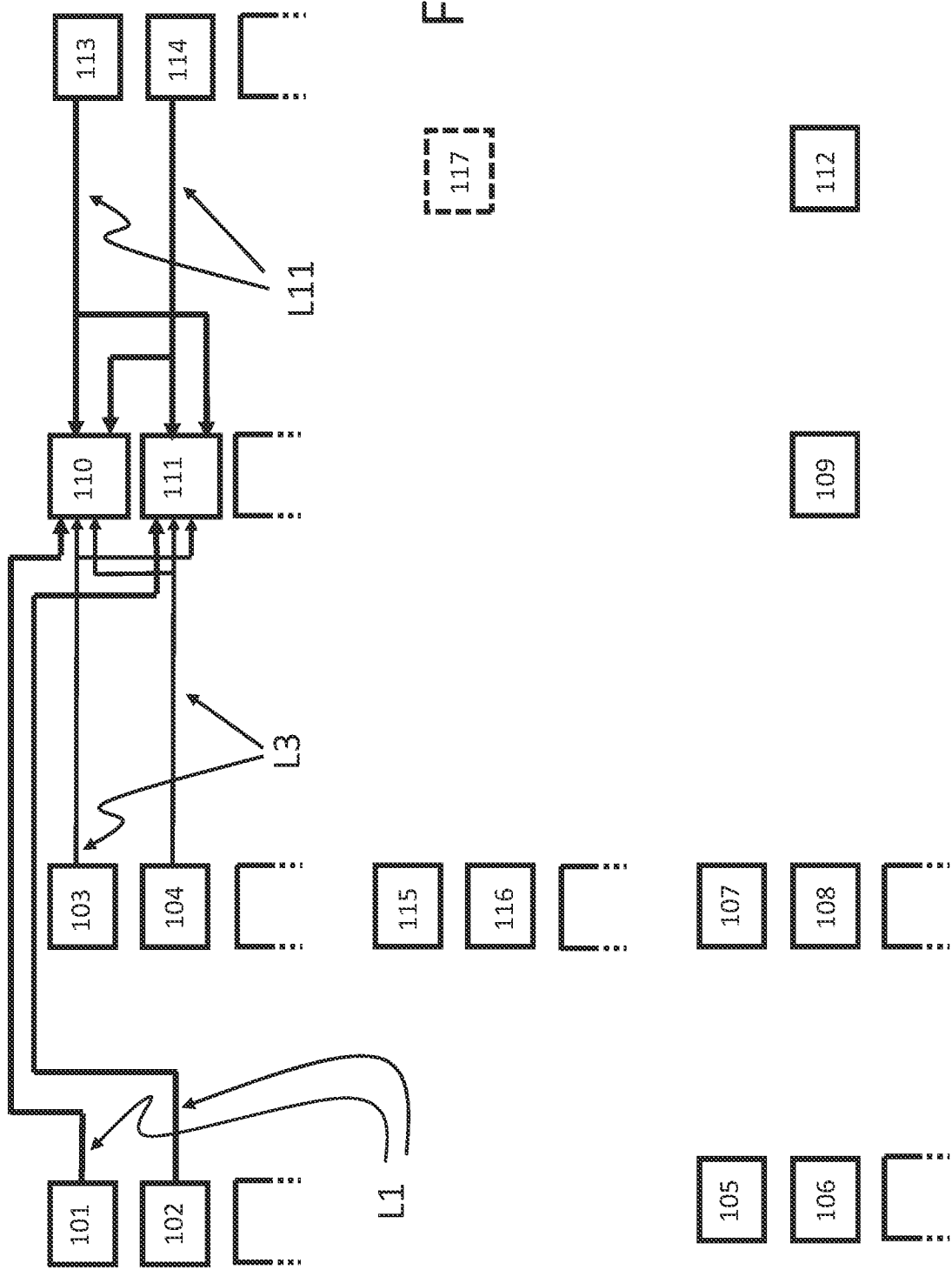
FIG. 2 illustrates the same installation, represented here in "post-filling" mode, in a partial schematic view in relation to the representation given in FIG. 1.

The invention proposed here is noteworthy in that it incorporates an analytical system capable of simultaneously analysing all the constituents of the gas mixture in real time at the exit of the mixing chamber and before it enters the compression stage (line L7 in appended FIG. 1) or optionally at the entry of the filling station (line L11 in appended FIG. 2).

A gas connection is thus established between the exit of the mixing chamber and the analytical system in order to analyse the composition of the gas mixture in bypass and in real time.

The gas mixture at the exit of the mixing chamber is directed to the compressor, which compressor makes it possible to increase the pressure of the gas from a few bars (4-5) to the desired pressure.

The desired filling pressure may typically be between 50 bar and 200 bar.

The high-pressure gas mixture at the exit of the compressor is then directed to one or more filling stations making it possible to distribute the gas mixture homogeneously into a batch of bottles (for example from 2 up to 24 bottles in parallel).

Once the setpoint of the pressure is reached in one of the bottles of the batch of bottles, the filling is stopped and the production is considered to be completed, and the precise estimation of the composition of the mixture in the bottles filled in this way is immediately known.

The analytical system has been calibrated beforehand with the aid of reference gas bottles and a procedure allowing a response accuracy of less than 0.5% relative.

The analytical system is equipped with analysers making it possible to obtain a response time of the analysers that is as short as possible, typically less than one minute, and a drift of each measurement over the filling time which is also as minimal as possible, a drift typically less than 0.25% of the measurement over two hours (a duration which corresponds approximately to the time for filling 24 bottles at a pressure of 200 bar).

Thus:
as a function of the composition of the gas mixture leaving the mixing chamber at a given instant; and
as a function of the composition calculated and estimated in real time of the gas mixture in the bottles of the batch by integrating the composition of the gas mixture leaving the mixing chamber from the start of filling; and
as a function of the intended final composition;
the system is adapted, in real time and automatically, if necessary, via a feedback loop, to modify the gas flow rates of each component of the mixture, mixing gas or gases as well as base gas or gases, by modifying the setting of the mass flow controllers associated with each component so as to maintain and/or correct upwards and/or downwards the concentrations of the mixture leaving the mixing chamber, thus making it possible to continue the filling with a nominal composition (a situation which may be termed "maintaining") or with a composition enriched (a situation which may be termed "correcting upwards") or depleted (a situation which may be termed "correcting downwards") for each component of the mixture.

Throughout the filling, this adjustment mechanism makes it possible to converge efficiently, accurately and reliably to the intended composition, and to do so despite possible incidents that occur during the filling.

There may be a variety of incidents, examples of which may be a pressure reduction of the base gas network (for example nitrogen) which leads to a reduction of a flow rate of this base gas for a few tens of seconds or even a few minutes, which causes an effective increase in the concentration of each of the other components of the mixture, and thus during these few tens of seconds an unexpected and undesired effective enrichment of the mixture injected into each bottle of the batch.

The concept of "integration" was mentioned above, and it should be understood here that the following situations may be envisaged:
the integration may be carried out while assuming that the filling rate is constant throughout the filling, which is a first design selection;
a variation of the filling rate during the filling may however be envisaged, in which case the integration may be carried out via the weighted integral by measuring the flow rate (which is available at the mixer) but may also be carried out by measuring the optional flow rate (element 117 in appended FIG. 1).

The filling method proposed according to the present invention makes it possible:
i. to detect and measure the effective enrichment and therefore take it into account in the calculation of the estimation of the composition of the gas inside the bottles throughout the duration of the filling;
ii. to correct downwards the composition of the mixture generated at the exit of the mixing chamber by ceasing to enrich the composition of the gas inside the bottles or even starting to re-deplete this gas in order to return to the desired target composition at the end of the filling ("correcting downwards" situation);
iii. once the incident and this transient correction have passed (over a duration which may be several minutes), the control and regulation mode used may instruct a return to nominal filling conditions ("maintaining" situation).

Conversely, the case could have been mentioned of an incident consisting of a pressure reduction of a bottle supply of one of the components of the mixture, which would cause depletion of the concentration of this component and would have to be compensated for by a transient enrichment ("correcting upwards"), over the time for returning to nominal filling conditions ("maintaining" situation).

The present invention therefore relates to a method for filling a batch of gas bottles with an identical gas mixture, wherein the gas mixture may consist of a single constituent in a matrix or a plurality of constituents in a matrix, which matrix consists of one or more base gases, in which a filling installation having the following elements is provided:
one or more reservoirs storing the base gas or gases, also referred to as "matrix" gases;
one or more high-pressure bottles storing the said constituent or constituents, also referred to as "mixing gases";
one or more high-pressure bottles storing one or more so-called reference gases, making it possible to calibrate an analytical system;
a mixing chamber;
gas lines suitable for conveying the base gases and the mixing gases to the mixing chamber, which gas lines are each equipped with one or more mass flow controllers (MFC);
a compression stage comprising a gas compressor;
a gas line suitable for conveying the gas mixture formed in the mixing chamber to the compression stage, which compression stage is suitable for pressurizing the gas mixture in order to be able to fill each of the bottles of the said batch of bottles therewith;
an analytical system having selected analysers (which is suitable for controlling the mass flow controllers);
a gas line suitable for conveying a part of the gas mixture formed in the mixing chamber to the analytical system in order to be able to carry out the analysis of the gas mixture conveyed to the system, which line is advantageously placed in bypass on the said gas line connecting the mixing chamber to the compression stage;
one or more filling stations making it possible to position the bottles of the said batch of bottles to be filled and suitable for distributing the gas mixture uniformly into each of the bottles of the said batch of bottles;
a gas line suitable for conveying the pressurized gas mixture from the compression stage to the filling station or stations, the or each filling station being capable of being entirely or partially occupied by the bottles of the said batch of bottles;
one or more gas lines suitable for conveying a part of the pressurized gas mixture in the bottles of the said batch of bottles to the analytical system in order to be able to perform a post-filling verification analysis of the bottles after the filling cycle (this analysis also allows monitoring of the composition of the mixture in real time during the filling);
characterized in that the following measures are carried out:
the gas mixture at the exit of the mixing chamber is conveyed to the compression stage, which carries out an increase of the pressure of the mixture to a desired setpoint;
the gas mixture at the exit of the compression stage is conveyed to the filling station or stations and uniform distribution of the gas mixture into the said batch of bottles is carried out, and the filling is stopped once a pressure setpoint has been reached in at least one of the bottles of the said batch of bottles;
real-time analysis of all the components of the gas mixture is carried out by the analytical system at the exit of the mixing chamber and before it enters the compression stage;
as a function of the result of the said real-time analysis of the composition of the gas mixture leaving the mixing chamber, at a given instant, a real-time estimation of the composition of the gas mixture in the bottles of the said batch is carried out by real-time integration from the start of filling of the composition of the gas mixture leaving the mixing chamber or real-time composition of the gas mixture entering the bottle or bottles of the said batch of bottles; and
a comparison of this estimation with one or more setpoint values for the final concentration or concentrations intended in each of the bottles of the batch is carried out, and if necessary feedbacks are carried out in real time in order to modify the gas flow rates of each component of the mixture, mixing gas or gases and/or base gas or gases, reaching the chamber, by modifying the setting of the mass flow controllers associated with each component, so as to maintain and/or correct upwards and/or correct downwards the particular concentrations of the components of the mixture leaving the mixing chamber, and thus to continue the filling with a nominal composition or a composition enriched or depleted with respect to one or more of the components of the mixture.

As will be readily apparent to a person skilled in the art, the feedbacks carried out according to the present invention make it possible for the estimated composition to be converged finally in real time as close as possible to the desired target composition.

According to one of the advantageous embodiments of the invention, the mixing is prepared by discharging the gas mixture that leaves the compression stage with the composition far from the setpoint to one or more vents. Once the composition of the gas mixture is stabilized, in a few minutes, typically about 10 minutes, at the desired target composition, the filling of the said batch of bottles is started.

This advantageous embodiment therefore proposes an analysis which may be referred to as "additional" analysis, namely an analysis which will make it possible to start the filling, an analysis of what is leaving the compression stage before it arrives at a station, in which it is compared with a setpoint and what is leaving is "discarded" if the result is not at least within an accepted limit of a given setpoint.

This embodiment may prove very particularly beneficial in certain situations and in particular for short filling durations (small batch in terms of number of bottles, low setpoint pressures, bottles with small capacities, etc.) when less time is available to react and re-converge.

LIST OF REFERENCE SYMBOLS

The nomenclature of the elements (taking for this example two items per element, although the number of items for each element may be more than two) present in the figures is as follows:
- 101: Reference bottle No 1
- 102: Reference bottle No 2
- 103: Base gas No 1
- 104: Base gas No 2
- 105: Mixing gas bottle No 1
- 106: Mixing gas bottle No 2
- 107: Mass flow controller No 1
- 108: Mass flow controller No 2
- 109: Mixing chamber
- 110: Analyser No 1
- 111: Analyser No 2
- 112: Compressor
- 113: Bottle to be filled No 1
- 114: Bottle to be filled No 2
- 115: Mass flow controller of the base gas No 1
- 116: Mass flow controller of the base gas No 2
- 117: Optional measurement (placed on the line L8) of the mass flow rate of the gas mixture between the compression stage and the batch of bottles
- L1: Gas line between the reference bottles and the analysers
- L2: Gas lines between the mixing gas bottles and the mass flow controllers controlling the mixing gases
- L3: Gas line between the base gas bottles and the analysers
- L4: Gas lines between the base gas bottles and the mass flow controllers controlling the base gases
- L5: Gas lines between the mass flow controllers controlling the base gases and the mixing chamber
- L6: Gas line between the exit of the mixing chamber and the entry of the compressor
- L7: Gas line between the exit of the mixing chamber and the analysers
- L8: Gas line between the exit of the compressor and the batch of bottles
- L9: Slaving line between the analysers and the mass flow controllers
- L10: Gas lines between the mass flow controllers controlling the mixing gases and the mixing chamber It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for filling a batch of gas bottles with a gas mixture, wherein the gas mixture may consist of a single constituent in a matrix or a plurality of constituents in a matrix, which matrix consists of one or more base gases, in which a filling installation having the following elements is provided:
   one or more reservoirs storing the matrix gas or gases;
   one or more high-pressure bottles storing the said constituent or constituents;
   one or more high-pressure bottles storing one or more reference gases, configured to calibrate an analytical system;
   a mixing chamber;
   gas lines configured for conveying the mixing gases and the matrix gases to the mixing chamber, which gas lines are each equipped with one or more mass flow controllers;
   a compression stage comprising a gas compressor;
   a gas line configured for conveying the gas mixture formed in the mixing chamber to the compression stage, which compression stage is configured for pressurizing the gas mixture in order to fill each of the bottles of the said batch of bottles therewith;
   an analytical system having selected analysers;
   a gas line configured for conveying a part of the gas mixture formed in the mixing chamber to the analytical system configured to carry out real-time analysis of the gas mixture sampled in this way, which line is advantageously placed in bypass on the said gas line connecting the mixing chamber to the compression stage;
   one or more filling stations making it possible to position the bottles of the said batch of bottles to be filled and suitable for distributing the gas mixture into each of the bottles of the said batch of bottles;
   a gas line suitable for conveying the pressurized gas mixture from the compression stage to the filling station or stations, the filling station or stations being capable of being entirely full or partially populated with the bottles of the said batch of bottles;
   one or more gas lines suitable for conveying a part of the pressurized gas mixture in the bottles of the said batch of bottles to the analytical system in order to be able in particular to perform a post-filling verification analysis of the bottles after the filling cycle;

wherein the following measures are carried out:
- conveying the gas mixture at the exit of the mixing chamber to the compression stage, which carries out an increase of the pressure of the mixture to a desired setpoint;
- conveying the gas mixture at the exit of the compression stage to the filling station or stations and the distribution of the gas mixture into the said batch of bottles is carried out, and the filling is stopped once a pressure setpoint has been reached in at least one of the bottles of the said batch;
- analysing on-line in real-time all the mixing components of the gas mixture by the analytical system at the exit of the mixing chamber and before entering the compression stage;
- estimating in real-time the composition of the gas mixture in one of the bottles is carried out by real-time integration from the start of filling of the composition of the gas mixture leaving the mixing chamber or real-time composition of the gas mixture entering the bottle or bottles of the said batch of bottles as a function of the result of the said real-time analysis of the composition of the gas mixture coming from the mixing chamber, at a given instant; and
- comparing this estimation with one or more setpoint values for the final concentration or concentrations intended in each of the bottles of the batch is carried out, and if necessary feedbacks are carried out automatically and in real time in order to modify the gas flow rates of each component of the mixture reaching the chamber, by modifying the setting of the mass flow controllers associated with each component, so as to maintain and/or correct upwards and/or correct downwards the particular concentrations of the components of the mixture leaving the mixing chamber, and thus to be able to continue the filling with a nominal composition or a composition enriched or depleted with respect to one or some of the components of the mixture.

2. The method according to claim 1, wherein a preliminary operation of preparing the mixture is carried out in the following way:
   a) analyzing the mixture leaving the compression stage before this mixture arrives in one or more of the stations;
   b) comparing the result of this analysis with a setpoint and venting the mixture if the difference between the result of the analysis and the setpoint is greater than a value considered to be acceptable;
   c) filling of the said batch of bottles is authorized when the result of the comparison of step b) is less than the said value considered to be acceptable.

* * * * *